United States Patent [19]

Hitomi

[11] Patent Number: 4,988,057
[45] Date of Patent: Jan. 29, 1991

[54] DRAG DEVICE FOR A SPINNING REEL

[75] Inventor: Yasuhiro Hitomi, Sakai, Japan

[73] Assignee: Shimano Industrial Company Limited, Osaka, Japan

[21] Appl. No.: 489,744

[22] Filed: Feb. 26, 1990

Related U.S. Application Data

[63] Continuation of Ser. No. 308,993, Feb. 10, 1989, abandoned, which is a continuation of Ser. No. 89,123, Aug. 25, 1987, abandoned.

[51] Int. Cl.$^5$ .............................................. A01K 89/027
[52] U.S. Cl. ...................................... 242/245; 242/306
[58] Field of Search .............. 242/243, 245, 285, 302, 242/303, 306

[56] References Cited

U.S. PATENT DOCUMENTS

| | | | |
|---|---|---|---|
| 900,563 | 10/1908 | Matts | 242/84.51 R |
| 3,006,573 | 10/1961 | Holahan | 242/84.5 P X |
| 3,120,357 | 2/1964 | Wood | 242/84.5 P |
| 4,591,108 | 5/1986 | Ban | 242/84.5 R |
| 4,598,879 | 7/1986 | Fujigawa et al. | 242/84.51 R X |
| 4,702,430 | 10/1987 | Saito | 242/84.5 A |
| 4,702,431 | 10/1987 | Kaneko | 242/84.5 A |

FOREIGN PATENT DOCUMENTS 57-65080 4/1982 Japan.
59-166664 11/1984 Japan.

Primary Examiner—Joseph J. Hall, III
Attorney, Agent, or Firm—Dickstein, Shapiro & Morin

[57] ABSTRACT

A drag device for a spinning reel, which is provided with first and second drag mechanisms for applying a rotational resistance to a spool shaft carrying a spool on which a fishing line is wound and with adjusting members of the drag mechanisms which are independently operable. A support cylinder is provided at a the reel body of the spinning reel and rotatably supports the adjusting member of the second drag mechanism. The support cylinder is provided with a regulation mechanism for regulating an adjusting operation range of the adjusting member of the second drag mechanism and an engaging recess for indicating substantially the center of the adjusting operation range. The adjusting member at the second drag mechanism is provided with an engaging member slidable radially of the support cylinder and engageable with the engaging recess and a spring member for biasing the engaging member in the direction of engaging with the engaging recess. This enables the center of the adjusting operation range of the adjusting member to be set.

6 Claims, 2 Drawing Sheets

DRAG DEVICE FOR A SPINNING REEL

This application is a Continuation of application Ser. No. 07/3308,9933, filed Feb. 10, 1989, which in turn is a Continuation of application Serial No. 089,123, filed Aug. 25, 1987, both of which now are abandoned.

FIELD OF THE INVENTION

The present invention relates to a drag device for a spinning reel, and more particularly to an improvement in a drag device for a spinning reel, which is provided with first and second drag mechanisms for applying a rotational resistance to a spool shaft carrying a spool, with the drag mechanisms being provided with adjusting members which independently adjust the rotational resistance applied to the spool shaft.

BACKGROUND OF THE INVENTION

Generally, the spinning reels are well known which have a front drag device which adjusts a rotational resistance applied to the spool with respect to the spool shaft or a rear drag device which applies a rotational resistance against rotation of the spool shaft fixedly supporting the spool. The present inventor has proposed a rear drag device having two drag mechanisms which can independently adjust the rotation resistance applied to the spool shaft. Such drag device, as disclosed in the U.S. Pat. No. 4,591,108, comprises a first drag mechanism formed of the thumb nut screwable with a projection at the rear portion of the reel body and a second drag mechanism formed of a lever. A braking force set by the first drag mechanism is made minimum and is adjustable by the second drag mechanism for increasing the braking force.

Accordingly, such drag device can adjust the above braking force while compensating for the minimum braking force.

Such drag device is provided with a positioning mechanism which can position the adjusting member of the second drag mechanism at a plurality of positions within the adjusting range of the adjusting member, but the positioning mechanism having plural positioning portions is unable to provide an indication of the center of the adjusting range, whereby the first drag mechanism sets the minimum braking force and the second drag mechanism adjusts the braking force in the direction of increasing the minimum braking force set by the first drag mechanism.

As a result, a problem is created in that the minimum braking force set by the first drag mechanism cannot be changed by the second drag mechanism so that the second drag mechanism can both increase or decrease the drag force relative to the value set by the first drag mechanism, so that the braking force can be decreased only by the first drag mechanism.

In brief, the braking force set by the first drag mechanism is adjustable by the second drag mechanism to be increased but not to be decreased. Hence, in such drag device purposely having the second drag mechanism and facilitating adjustment of the braking force set by the first drag mechanism, when a fishing line is subjected to a load overcoming its proof stress, there may nevertheless result a cut the line by minimum braking force set by the first drag mechanism.

SUMMARY OF THE INVENTION

An object of the invention is to provide a drag device which allows an adjusting member at a second drag mechanism to indicate its position at about the center of a range of adjustment so that a first drag mechanism can set the minimum braking force at the central position of the adjusting member and a braking force set by the first drag mechanism is made adjustable by use of the adjusting member of the second drag mechanism toward both the increasing side and decreasing side, thereby solving the aforesaid problem.

The present invention provides an improvement in a drag device for a spinning reel provided with a first drag mechanism and a second drag mechanism which apply rotational resistances to a spool where shaft having a spool, the first and second drag mechanism are provided with adjusting members for independently adjusting the rotational resistance given to the spool shaft respectively. The present invention includes an adjusting member at the second drag mechanism which is supported rotatably with respect to a support cylinder projecting from the rear of a reel body at the spinning reel. The support cylinder is provided with regulation means for regulating the adjusting range of the adjusting member of the second drag mechanism and an engaging recess to indicate substantially the central position of the adjusting range regulated by the regulation means. The adjusting member of the second drag mechanism is provided with an engaging member supported slidably radially of the support cylinder to be engageable with the engaging recess, and a spring member for biasing the engaging member in the direction of engaging the engaging member with the engaging recess, thereby enabling the central position of the adjusting operation range of the adjusting member to be set.

Accordingly, the present invention allows the adjusting member at the second drag mechanism to indicate a substantially central position of the adjustment operation range of the adjusting member by means of engagement of the engaging member with the engaging recess, whereby the adjusting member is positioned at the aforesaid center position to set a braking force by the first drag mechanism. Hence, it is possible to increase or decrease the braking force by means of the second drag mechanism.

As a result, the braking force set by the first drag mechanism can be made optimum and moreover the second drag mechanism can set the minimum braking force and the maximum one with respect to the optimum braking force. Hence, the braking force need not beset too small or too large, thereby solving the problem that the braking force set by the first drag mechanism may result in a cut in the fishing line.

The above and further objects and novel features of the invention will be more fully apparent from the following detailed description when the same is read in connection with the accompanying drawings.

DETAILED DESCRIPTION OF THE INVENTION

Figure 6:
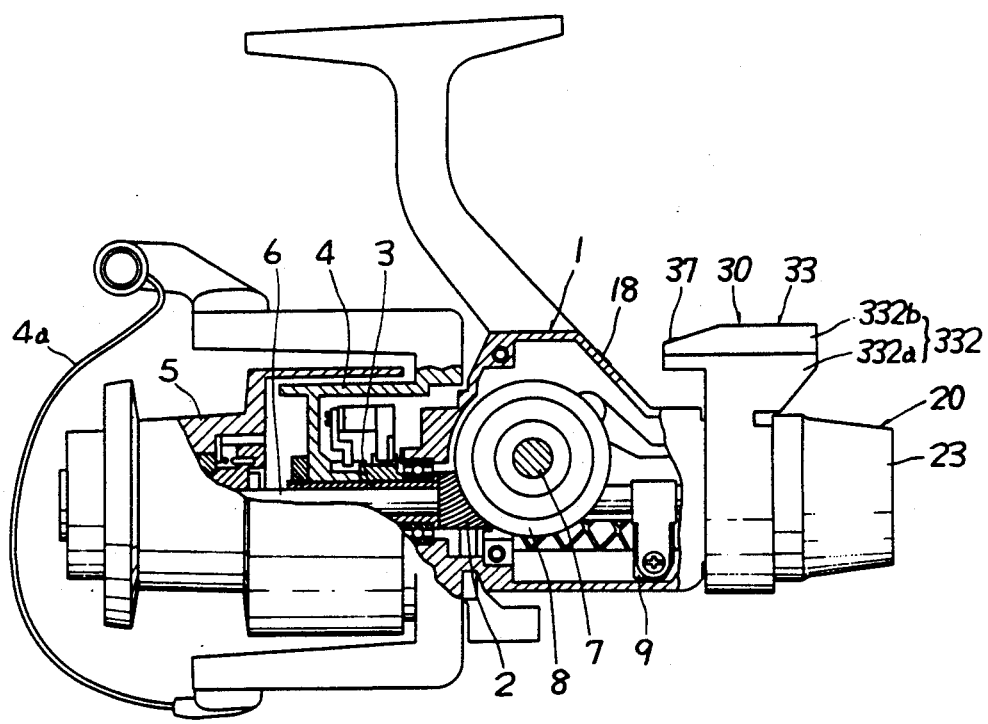
FIG.6 is a partially cutaway front view of a spinning reel according to the invention.

A spinning reel shown in FIG.6 is provided with a hollow reel body 1 having at its upper surface a mounting leg for mounting the reel to a fishing rod and at its front portion a through bore. Reel body 1 rotatably supports at the through bore through a bearing a tubular driving shaft 3 carrying a pinion 2. A rotary frame is mounted on the outer periphery of the fore end of the driving shaft 3. Rotary frame 4 includes a bell arm 4a; A spool shaft 3 carrying a spool 5 is supported in a shaft bore of the driving shaft 3 is to be supported axially slidably and rotatably movable therein. A handle shaft 7 is at the side wall of the reel body 1. Handle shaft 7 extends perpendicularly relative to the driving shaft 3.

At part of the handle shaft 7 entering into the reel body 1 is provided a master gear 8 engageable with the pinion 2. A handle ( not shown ) is mounted on part of the handle shaft 7 projecting outwardly from the reel body 1. The handle is rotated to drive the driving shaft 3 so as to rotate the rotary frame 4, and the spool 5 is moved longitudinally of the reel through a reciprocation mechanism 9, thereby winding a fishing line onto the spool 5.

Figure 1:
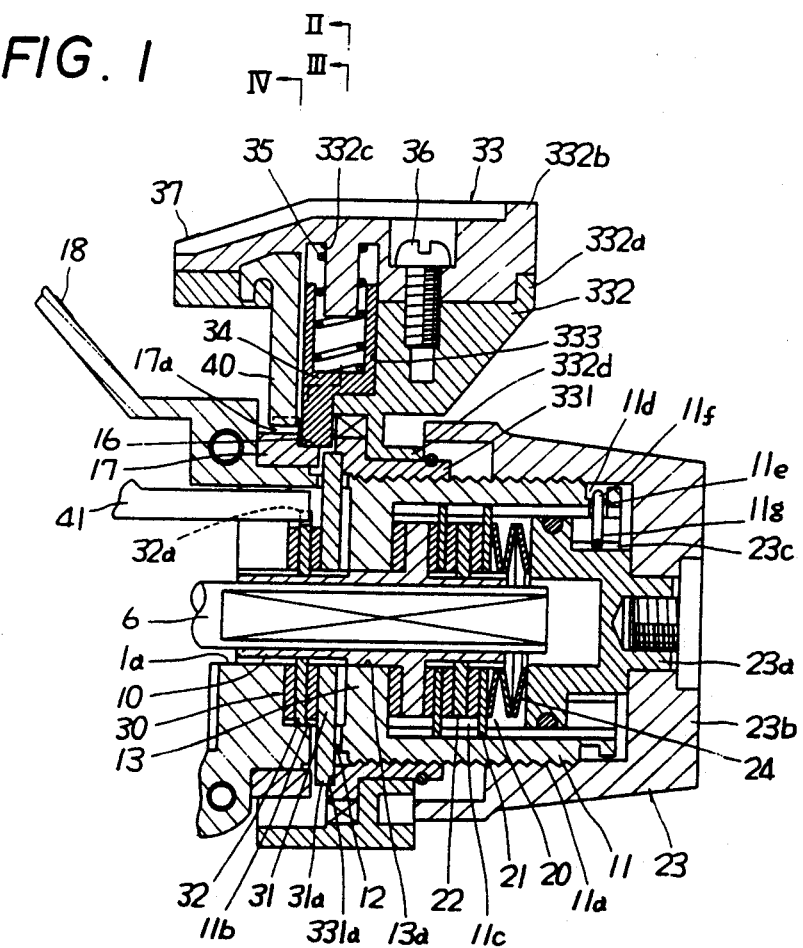
FIG.1 is a longitudinal sectional front view of an embodiment of a drag device for a spinning reel of the invention.

A drag device for the spinning reel of the invention, as shown in FIG.1, is provided with (1) a first drag mechanism provided with a first braking member 21 at the reel body side,i.e., fixed to the reel body (2) a second braking member 22 at the spool shaft side, rotatable together with the spool shaft 6, and (3) a first adjusting member 23 in press contact with the first and second braking members 21 and 22 to adjust a braking force applied thhereby. A second drag mechanism 30 is provided with (1) a third braking member 31 at the reel body side, (2) a fourth braking member 32 at the spool shaft side, rotatable together with the spool shaft 6, and (3) a second adjusting member 33 in press contact with the third and fourth braking members 31 and 32 to adjust the braking force applied thereby. The first adjusting member 23 or the second adjusting member 33 independently adjusts a braking force applied to the spool shaft 6 through the first drag mechanism 20 or the second drag mechanism 30.

Referring to FIGS. 1 through 5, at the rear side of the reel body 1 are provided a through bore 1a and a support cylinder 11 extending rearwardly from around the through bore 1a, and having at its root portion a window 12 and at its outer periphery a screw thread 11a. A lengthwise intermediate portion of the support cylinder 11 includes a partition 13 having a through bore 13a to divide the interior of the support cylinder 11 into a rear chamber 11c and a front chamber 11b having the window 12. Between the through bores 1a and 13a is rotatably supported a rotary cylinder 10 the rear of which extends into the rear chamber 11c, and the end of the spool shaft 6 which enters into the reel body 1 is fitted into the rotary cylinder 10 to be non-rotatable and axially movable relative thereto.

Figure 2:
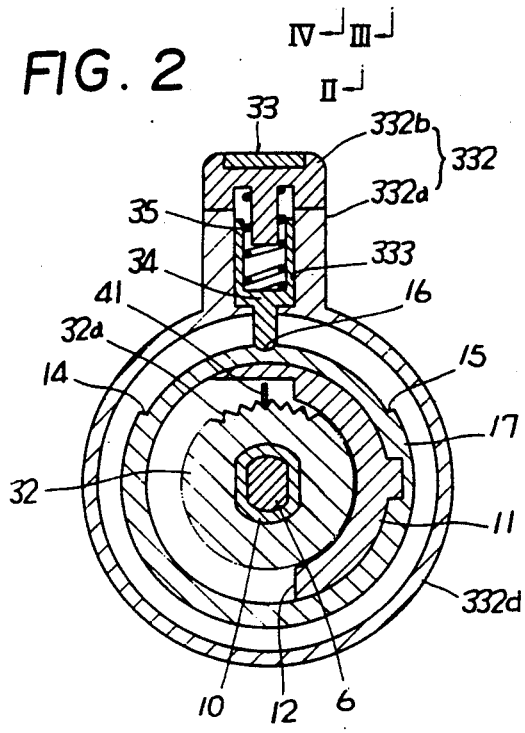
FIG.2 is a sectional view taken along the line II—II in FIG.1.
Figure 3:
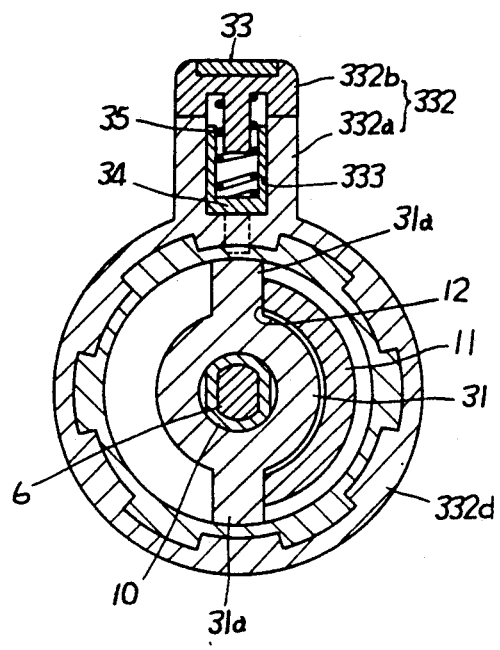
FIG.3 is a sectional view taken along the line III—III in FIG.1.
Figure 4:
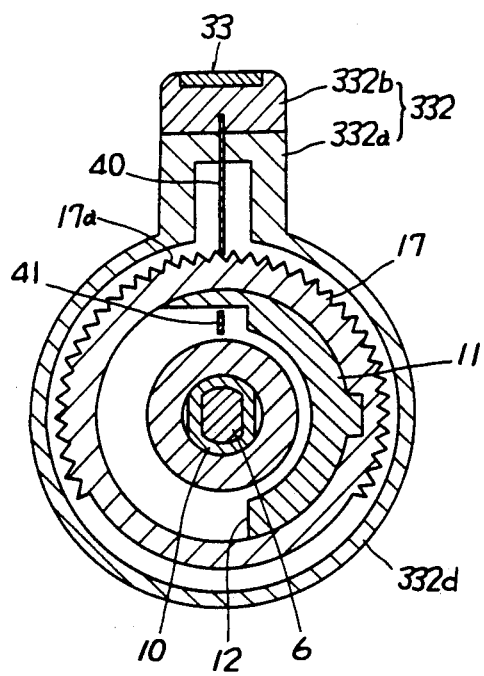
FIG.4 is a sectional view taken along the line IV—IV in FIG.1.

The support cylinder 11 rotatably supports at the outer periphery of its root portion the second adjusting member 33 and at the outer periphery of its utmost end the first adjusting member 23. Also, the support cylinder 11, as shown in FIG.2, is provided at the outer periphery of its root portion with first and second regulating portions 14 and 15 for regulating an adjusting operation range of the second adjusting member 33 and with an engaging recess 16 for indicating a substantially central position of the adjusting operation range regulated by the regulating portions 14 and 15. In addition, the regulating portions 14 and 15 and engaging recess 16 are formed on a ring 17 mounted on the outer periphery of the support cylinder 11, which may alternatively be directly formed thereon. The regulating portions 14 and 15 are formed at both end faces of a recess formed on the outer periphery of the ring 17 and extending circumferentially thereof. Alternatively, the regulating portions 14 and 15 may be formed by a radially outwardly projecting part of the ring 17 or by being recessed radially inwardly of the same, which are not defined or limited in construction.

In the second drag mechanism 30, the third braking member 31 at the reel body side is provided with an engaging projections 31a projecting outwardly through the window 12 and supported to be non-rotatable and axially movable within the front chamber 11b. Fourth braking member 32 at the spool shaft side is supported to be not-rotatable and axially movable onto the outer periphery of the front end portion of the rotary cylinder 10 in the front chamber 11b.

The second adjusting member 33 comprises a cylindrical boss 331 screwable with the screw thread 11a at the support cylinder 11 and a lever 332 extending radially outwardly from one side of the boss 331. The boss 331 is provided at the front end thereof with an engaging portion 331a engageable with the engaging projections 31a, so that the rotation of boss 331 is transmitted to the third braking member 31 at the reel body side through the engaging protions 331a and engaging projections 31a. The lever 332 is operated to screw boss 331 forwardly to move the third braking member 31 axially forwardly in a range of the window 12, thereby bringing the third braking member 31 into press-contact with the fourth braking member 32. Thus, the rotary cylinder 10 supporting the fourth braking member 32 the spool shaft 6 are subjected to the braking force against their rotations.

The lever 332 is provided with a holding bore 333 extending lengthwise of the lever 332 so that the holding bore 333 slidably holds an engaging member 34 engageable at its utmost end with the engaging recess 16 and contains a coil spring 35 for biasing the engaging member 34 in the direction of engaging with the engaging recess 16. Engagement of the engaging member 34 with the engaging recess 16 enables the central position in the adjusting operation range of the second adjusting member 33 to be set.

Also, the lever 332 comprises a lever body 332a extending from the boss 331 and a lid 332b coupled with the utmost end of the extension of the lever body 332a. The holding bore 333 is provided at the lever body 332a and is open at the utmost end of the lever body 332a so that the engaging member 34 and coil spring 35 can be inserted from the opening into the holding bore 333, with the opening of the holding bore 333 being closed by the lid 332b. The lid 332b is provided with a spring holding face 332c for receiving a lengthwise outer end of the coil spring 35, and is mounted on the lever body 332a to prevent the engaging member 34 and coil spring 35 from escaping from the lever body 332a. Lid 332b is detachably screwably mounted thereon through a screw 36.

The boss 331 and lever 332 are separate from each other and provided at the root of lever 332 with a fitting cylinder 332d fitted not-rotatably at the outer periphery of boss 331. The boss 331 and lever 332 may alternatively be integral.

The fitting cylinder 332d is provided to screw the boss 331 with the support cylinder 11 so as to preadjust a press-contacting force of the third and fourth braking members 31 and 32, and thereafter the lever 332 can be coupled with the boss 331, thereby having the advantage of disposing the lever 332 always in the optimum position with respect to the reel body 1.

Also, the lever 332 and a portion at the reel body 1 opposite to the engaging recess 16 are provided with a position setter 37 and a reference portion 18 respectively, thereby making it possible to view the second adjusting member positioned in the center of the adjusting operation range.

Also, the first drag mechanism 20 supports the first braking member 21 non-rotatably and axially movably at the inner peripheral surface of the rear chamber 11c and the second braking member 22 non-rotatably and axially movably at the outer peripheral surface of the rotary cylinder 10 positioned in the rear chamber 11c. The first adjusting member 23 at the first drag mechanism 20 is composed of a pusher 23a abutting against the outermost side surface of the first braking member 21 through dish-like springs 24 and a cup-like thumb nut 23b detachably engageable with the pusher 23a. Thumb-nut 23b screws with the screw thread 11a at the support cylinder 11 and rotates to press-contact the first braking member 21 with the second braking member 22. In addition, the first adjusting member 23 may alternatively be formed of the pusher 23a and thumb nut 23b integral with each other.

Figure 5:
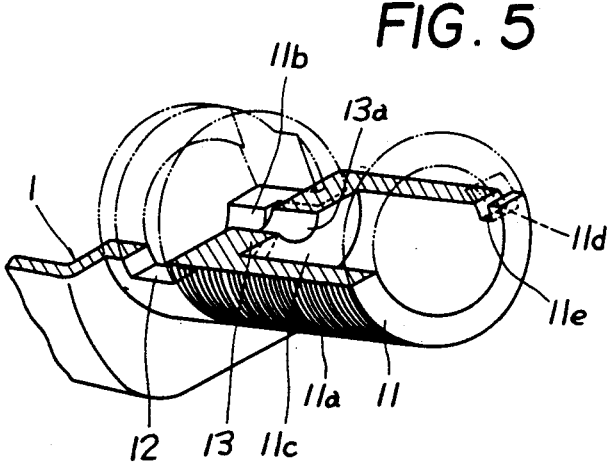
FIG.5 is a partially cutaway perspective view of a support cylinder according to the invention.

The window 12, as shown in FIG.5, is formed by circumferentially cutting out the lengthwise front end of the support cylinder 11 at an angle of about 180°, thereby inserting the third braking member 31 into the front chamber 11b at the support cylinder 11 through the windows 12. Alternatively, a plurality of windows 12 may be provided at predetermined intervals. Thus, the windows 12 are not particularly limited to any particular construction.

In addition, the spinning reel, as shown in the drawings, is provided at the outer periphery of the ring 17 mounted on the support cylinder 11 with tiny sound generating teeth 17a and between the lever body 332a and the lid 332b with a sound generating pawl 40 engageable with the sound generating teeth 17a, so that, when the second adjusting member 33 is turned, the pawl 40 is deflected to change its engaging position with the teeth 17a. thereby intermittently generating sounds.

At the outer periphery of the support cylinder 11 are provided a groove 11d extending circumferentially and a through bore 11e extending from an intermediate portion of the groove 11d into the rear chamber 11c. An elastic ring 11f of substantially C-shape and bending inwardly at an intermediate portion 11g to be formed in a substantially U-shape is fitted into the groove 11d, the bending portion 11g entering into the through bore 11e. Splines 23c are provided circumferentially at the outer peripheral surface of the pusher 23a and the utmost end of the bending portion 11g engages with the splines 23c, so that, when the first adjusting member 23 is rotatably operated, sounds are intermittently generated and also the pusher 23a is prevented from escaping from the reel body 1.

The fourth braking member 32 at the second drag mechanism 30 is provided at its outer periphery with tiny teeth 32a, and an elastic plate 41 engageable with the teeth 32a is mounted in the reel body 1, so that when the spool 5 together with the spool shaft 6 slidably rotates by tension applied to the fishing line, the elastic plate 41 is deflected to thereby generate intermittent engaging sounds.

When the spinning reel having the above-described drag device is used for fishing, the first adjusting member 23 is rotatably operated so that a braking force of the first drag mechanism 20 is preset corresponding to a particular kind of fish desired to be caught.

In particular, when the braking force of the first drag mechanism 20 is set, the engaging member 34 at the second adjusting member 33 preengages with the engaging recess 16 at the support cylinder 11, with the second adjusting member 33 being positioned at a substantially central position within the adjusting operation range regulated by the regulating portions 14 and 15. In this condition, since the engaging member 34 is biased by the coil spring 35 in the direction of engaging with the recess 16, the clicking feeling caused by engagement of the engaging member 34 with the recess 16 allows an angler to be informed of the engagement with ease, thereby enabling the second adjusting member 33 to be positioned accurately at substantially the center of the adjusting range. The reference portion 18 and position setting portion 37 are provided at the reel body 1 and second adjusting member 33, whereby it is easy to visually determine that the second adjusting member 33 is positioned at the center of the above range.

After the second adjusting member 33 is positioned at the center of the adjusting operation range, the first adjusting member 23 is rotatably operated to set the braking force of the first drag mechanism to a maximum corresponding to a fish to be caught. In addition, when the first adjusting member 23 is rotated, the first and second braking members 21 and 22 are brought into press-contact with each other, whereby the rotary cylinder 10, and in turn the spool shaft 6 therein, can be given a predetermined braking force.

For fishing after the braking force is set as described above, the second adjusting member 33 is rotated corresponding to a pulling force of a hooked fish, thereby increasing or decreasing the braking force set by the first drag mechanism 20.

In other words, the second adjusting member 33 is turned toward the first regulating portion 14 to thereby decrease the braking force set by the first drag mechanism 20, and is turned to a maximum toward the first regulating portion 14, thereby enabling the braking force to be changed to a minimum with respect to the braking force set by the first drag mechanism 20. The second adjusting member 33 is turned toward the second regulation portion 15 to thereby increase the braking force set by the first drag mechanism 20, and is turned to a maximum toward the same, thereby enabling the braking force to be changed to a maximum with respect to the braking force set by the first drag mechanism 20. Accordingly, the braking force is not excessively large or small, and there is no risk that the braking force set by the first drag mechanism 20 may cut the fishing line.

The second adjusting member 33, after fishing, is restored to the position where the position setting portion 37 coincides with the reference portion 18, whereby the engaging member 34 engages with the engaging recess 16 and the second adjusting member 33 can be positioned accurately at the center of the adjusting operation range.

As seen from the above, the present invention allows the adjusting member at the second drag mechanism to be positioned at substantially the center of the adjusting operation range, thereby enabling the braking force to be set by the first drag mechanism, and moreover, the adjusting member at the second drag mechanism is operated to enable the braking force set by the first drag mechanism to be increased or decreased. Hence, the braking force set by the first drag mechanism is made optimum and also the second drag mechanism can set the minimum and maximum braking forces with respect to the optimum braking force, thereby eliminating an excessively small or large braking force and solving the problem in that the braking force set by the first braking force may cut the fishing line.

While an embodiment of the invention has been shown and described, above, the invention is not limited to the specific construction set forth in the specification, which is merely exemplary rather than defined or limited.

What is claimed is:

1. A spinning reel, including
a spool shaft;
a spool supported on said spool shaft;
a reel body;
a support cylinder projecting from a rear portion of said reel body,
a drag device provided with a drag means for applying a rotational resistance to said spool shaft, said drag means comprising a first adjusting member and a second adjusting member for independently adjusting said rotational resistance applied to said spool shaft, said second adjusting member being supported rotatably with respect to said support cylinder, said support cylinder comprising a regulating means for regulating an adjusting operation range of said second adjusting member, said drag device comprising positioning means for ensuring accurate positioning of said second adjusting member at a substantially central position of said adjusting operation range regulated by said regulating means, said positioning means comprising (i) only one engaging recess, said engaging recess being located at said substantially central position of said adjusting operation range regulated by said regulating means, said adjusting operation range having no other engaging recesses other than said one engaging recess, and (ii) only one engaging member of said second adjusting member, said engaging member being supported to said second adjusting member to a slidably movable radially of said support cylinder and engageable at its utmost end with said one engaging recess and a spring member for biasing said engaging member in a direction of engaging with said one engaging recess, whereby said central position of said adjusting operation range of said second adjusting member can be set.

2. A spinning reel according to claim 1, wherein an indication means is disposed between said second adjusting member of said drag means and said reel body, said indicating means enabling said second adjusting member positioned at said substantially central position of said adjusting operation range to be visible from the outside, said indication means comprising a position setter positioned on said second adjusting member of said drag means opposite said engaging member and a reference portion positioned on said reel body opposite to said one engaging recess, whereby when said position setter and said reference portion are aligned, said engaging member is engaged with said one engaging recess.

3. The spinning reel as in claim 1, wherein said second adjusting member comprises a boss supported rotatably with respect to said support cylinder and a lever portion extending radially outwardly of said boss, said lever portion comprising a holding bore extending lengthwise of said lever portion, said engaging member being supported slidably within said holding bore of said lever portion, said spring member being disposed in said holding bore to bias said engaging member toward said engaging recess.

4. A spinning reel according to claim 3, wherein said lever portion comprises a lever body extending from said boss and a lid coupled with an utmost end in the extending direction of said lever body, said lever body including said holding bore which slidably supports said engaging member, said holding bore being open at its utmost end in the extending direction of said lever body and closed by said lid, said lid comprising a spring holding face for holding a lengthwise outside end of said spring member biasing said engaging member toward said engaging recess.

5. A spinning reel according to claim 4, wherein said support cylinder includes sound generating teeth at its outer periphery and a sound generating pawl engageable at its utmost end with said sound generating teeth is disposed at a root portion between said lever body and said lid.

6. A spinning reel according to claim 3, wherein said lever portion comprises a lid coupled with an utmost end of an extending direction of said lever portion, said engaging member includes a recess in which said coil spring is at least partially disposed, and said lid includes a cylindrical recess in which an end of said spring member is disposed and a projecting member which projects into a center area of aid spring member and into said recess in said engaging member.

* * * * *